(12) United States Patent
Bordeleau et al.

(10) Patent No.: US 6,649,204 B1
(45) Date of Patent: *Nov. 18, 2003

(54) HOPPED MALT BEVERAGE HAVING ENHANCED LIGHT STABILITY

(75) Inventors: Joseph Raymond Luc Bordeleau, London (CA); David John Hastings, London (CA); Micheal Jerome McGarrity, London (CA)

(73) Assignee: Labatt Brewing Company Limited, London (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,934

(22) Filed: Sep. 17, 1999

Related U.S. Application Data

(63) Continuation-in-part of application No. 09/102,014, filed on Jun. 22, 1998, now abandoned, which is a continuation of application No. 08/760,177, filed on Nov. 29, 1996, now Pat. No. 5,811,144, which is a continuation of application No. 08/481,983, filed on Jun. 7, 1995, now Pat. No. 5,582,857, which is a continuation of application No. 08/208,908, filed on Mar. 11, 1994, now abandoned, and a continuation of application No. 08/003,516, filed on Jan. 12, 1993, now abandoned.

(51) Int. Cl.⁷ .............................................. A23L 1/025
(52) U.S. Cl. .................... 426/330.4; 426/248; 426/592; 426/600
(58) Field of Search .............................. 426/330.4, 248, 426/592, 600

(56) References Cited

U.S. PATENT DOCUMENTS

| | | | |
|---|---|---|---|
| 50,523 A | 10/1865 | Wall | |
| 334,222 A | * 1/1886 | Fitch | 99/277.1 |
| 2,195,662 A | * 4/1940 | Van Sant | 99/277.1 |
| 2,452,968 A | 11/1948 | Ulhlein et al. | 99/48 |
| 3,037,116 A | * 5/1962 | Weber | 250/48 |
| 3,628,445 A | * 12/1971 | Weber | 99/277.1 |
| 3,787,587 A | 1/1974 | Weber | 462/248 |
| 4,389,421 A | 6/1983 | Palamand | 426/330.4 |
| 5,013,968 A | * 5/1991 | Russell et al. | 313/641 |
| 5,582,857 A | * 12/1996 | Bordeleau et al. | 426/330.4 |
| 5,696,380 A | 12/1997 | Cooke et al. | 250/438 |
| 5,811,144 A | * 9/1998 | Bordeleau et al. | 426/330.4 |

OTHER PUBLICATIONS

Tamer et al., Enzyme Microb Technology 10:754–756, Dec. 1988.

Verzele, M. Et al., U. Inst. Brew. 73:255–257, 1967.

Sakuma et al., "Sunstruck Flavor Formation in Beer," American Society of Brewing Chemists, Inc., 1991, 162–165.

* cited by examiner

Primary Examiner—Curtis E. Sherrer
(74) Attorney, Agent, or Firm—Levy & Grandinetti

(57) ABSTRACT

An improved process for the production of a hopped malt beer wherein a processing liquid containing riboflavin is hopped to form the desired beverage. The improvement comprises subjecting that processing liquid to an effective amount of actinic radiation of a wavelength adapted to decompose the riboflavin and thereby reduce the amount thereof, whereby a beer having enhanced light stability is obtained.

14 Claims, 4 Drawing Sheets

HOPPED MALT BEVERAGE HAVING ENHANCED LIGHT STABILITY

CROSS-REFERENCES TO RELATED APPLICATIONS

This application is a continuation-in-part of U.S. application Ser. No. 09/102,014, filed Jun. 22, 1998 now abandoned, which is a continuation of U.S. application Ser. No. 08/760,177, filed Nov. 29, 1996, now U.S. Pat. No. 5,811,144, which was a continuation of U.S. application Ser. No. 08/481,983, filed Jun. 7, 1995, now U.S. Pat. No. 5,582,857, which was a continuation of U.S. patent application Ser. No. 08/208,908, filed Mar. 11, 1994, now abandoned, and a continuation of U.S. patent application Ser. No. 08/003,516, filed Jan. 12, 1993, now abandoned.

BACKGROUND OF THE INVENTION

1. Field of the Invention

The present invention relates to hopped malt beverages, especially alcoholic brewery beverages produced at least in part from malt. More particularly, the present invention relates to imparting to hopped malt beverages improved stability against light-induced off flavors.

2. Description of Related Art

As is well known and accepted in the malt beverage brewing art, subjecting a hopped malt brewery beverage, especially an alcoholic hopped malt brewery beverage, such as, lager, ale, porter, stout, and the like (herein generically referred to as "beer") to sunlight or artificial light results in a significantly deleterious effect on the sensory qualities of the beverage by generating a so-called "skunky" flavor, which is sometimes also referred to as "sunstruck" or "light struck" flavor. It is believed that the skunky flavor is due to photochemical changes in the beverage that produce volatile sulfur-containing compounds. These sulfur compounds are thought to be formed at least in part by reaction of other sulfur-containing compounds with photochemically degraded hop components in the beverage. Only very small amounts of these sulfur compounds are required to be present to impart the skunky flavor to the beverage and render it unacceptable. The photochemical reaction is assisted by the presence of riboflavin, one of several photo-initiators in the beverage, the riboflavin emanating mainly from the malt used in the production of beer and to a minor extent via the hops and, according to the common wisdom, the action of yeast during the fermentation (See Tamer et al. *Enzyme Microb Technology* 10:754–756 (December, 1988)).

Attempts to prevent beverages from becoming skunky involve enclosing the beer bottles made of protective, i.e., colored, glass, brown or amber being most efficient (see U.S. Pat. No. 2,452,968), or in cans. These bottles reduce or eliminate the transmission to the beverage of light of wavelength shorter than about 560 nanometers. Such light is most harmful because it assists the riboflavin in enhancing the production of the undesirable volatile sulfur compounds.

Another method developed to address the problem of "skunky" flavor production uses reduced isohumulones in place of hops or hop extracts (see Verzele, M., et al., *U. Inst. Brew.* 73:255–257, (1967)). Other methods involve adding light-stabilizing materials to the beverage (see U.S. Pat. No. 4,389,421). However, in some jurisdictions, the use of such compounds has not been approved and, further, many brewers are reluctant to use any additives at all, but, rather, still use hops or hop extracts in an effort to achieve traditional beer flavor.

The problem of skunky flavor has been the subject of research for many years, and such research continues (see Sakuma, et al., "Sunstruck Flavor Formation in Beer," *American Society of Brewing Chemists*, Inc. (1991), 162–165). This article also deals with the part believed to be played by riboflavin in the reaction that produces the skunky flavor and suggests that removing riboflavin from the finished beer may solve the problem. However, an acceptable means for achieving that suggestion has not been readily apparent, and the problem persists.

The most favorable context in which light is used in association with malt beverages is described in U.S. Pat. No. 3,787,587. There, an actinic light treatment on finished beer is used to accelerate the "aging" and "maturing" thereof. Moreover, sunlight or artificial light was used as early as 1865 (see U.S. Pat. No. 50,523) to treat the surface of boiling wort to decolorize it. The boiling wort, in keeping with typical brewery practices, would presumably have been hopped and open to a highly oxygenated atmosphere during the boiling treatment. In both of these processes, it is highly probable that skunky beer flavor would ensue in the finished product. This is in keeping with what is well known in the art about photochemical degradation in hopped malt beverages. It is also in keeping with the general view that exposure of beer to light is anathema and should be avoided at all costs in the interest of maintaining product shelf life.

The literature also teaches a process in which sake, a unique Japanese fermented liquor prepared using rice, has been subjected to a light treatment (see Japanese published Patent Application 67667, entitled "Process for Production of Sake Hardly Affected by Microbial Deterioration"). This publication discloses treating finished sake with light in the 200- to 700-micron range—the object being to have the light decompose the riboflavin present in the finished sake, which riboflavin is an essential nutrient for the lactic acid bacteria that are responsible for infectious spoilage in finished sake. As a consequence of the riboflavin destruction, the growth of the bacteria is said to be inhibited and the sake preserved. Sake is, of course, a different product from beer, being an unhopped, non-malt product produced from rice using a starch-digestive enzyme, amylase, obtained from a mold and a special sake yeast to effect the fermentation. In particular, it should be noted that the riboflavin in sake, absent any lactic acid bacterial infection, does not pose the off-flavor development problems that are typically associated with hopped malt-containing products, such as, beer.

The role of light in the production of hopped malt beverages, and especially in brewing, has received a great deal of attention, and it is generally accepted that, in malt brewery beverages, especially those of an alcoholic nature, photochemical reactions produce accelerated aging and, in general, will shorten a malt beverage's shelf life and engender undesirable flavor development.

SUMMARY OF THE INVENTION

In accordance with the present invention, it has now been found that, in the production of a hopped malt beverage, if riboflavin is substantially absent, or present in only a relatively small or "insignificant" amount, in a process liquid prior to hopping, then the resulting beverage has enhanced stability against light and less tendency to produce skunky off-flavors.

Wort that is produced in the usual manner from malt(s) typically has a relatively high riboflavin content (e.g., about 0.4 ppm or more). As used herein, riboflavin contents above 0.2 ppm are defined as "high." In accordance with the present invention, the riboflavin content is reduced to less than 0.2 ppm, that level being defined for use herein as an "insignificant" amount.

The present invention provides a hopped malt beverage having enhanced light stability, with the beverage comprising hopped processing liquid that had a riboflavin content of less than 0.2 ppm during hopping.

More particularly, the present invention relates to an improved process for the production of a hopped malt beverage wherein a process liquid having a high riboflavin content is hopped to produce the desired beverage, wherein the improvement comprises treating the process liquid with an effective amount of actinic radiation from a lamp having a minimum power output specification as follows:

at least about 90 percent between about 300 and less than about 800 nanometers based on wavelength specific output power as measured in watts per square meter at a distance from the light source of three meters, whereby the riboflavin content is reduced to less than about 0.2 ppm and the resulting hopped malt beverage has enhanced stability to light.

In another aspect the present invention relates to a hopped malt beverage having enhanced light stability prepared by a process comprising treating a process liquid having a high riboflavin content with an effective amount of actinic radiation from a lamp having a minimum power output specification as follows:

at least about 90 percent between about 300 and less than about 800 nanometers based on wavelength specific output power as measured in watts per square meter at a distance from the light source of three meters, whereby the riboflavin content is reduced to less than about 0.2 ppm and the resulting hopped malt beverage has enhanced stability to light.

Preferably the hopped malt beverage is beer.

DESCRIPTION OF THE PREFERRED EMBODIMENTS

Figure 1:
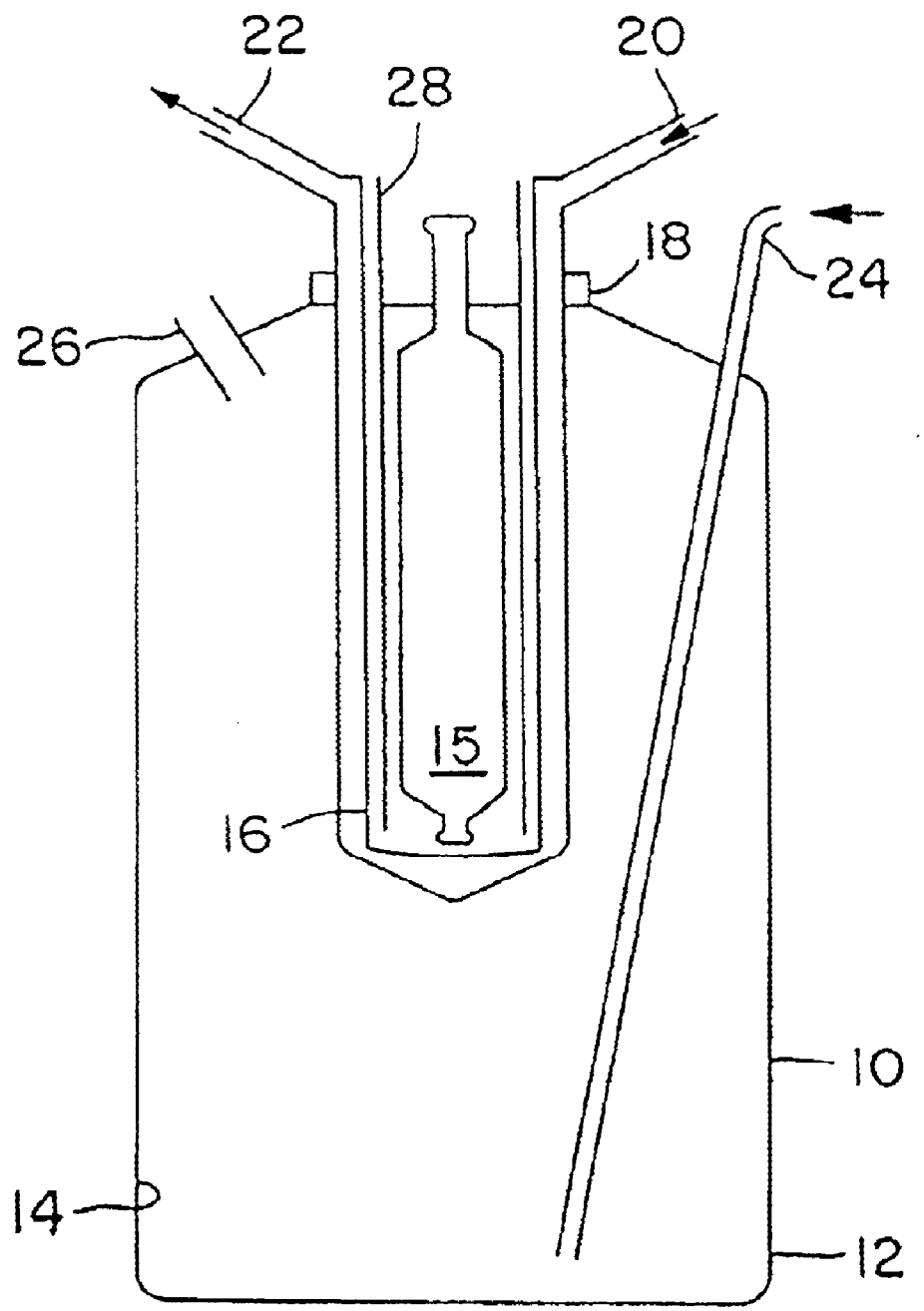
FIG. 1 is a simple diagrammatic cross section through a pilot scale reactor suitable for the batch irradiation of liquids.

Very surprisingly, the light problem discussed above can, in a preferred embodiment, be part of the solution, in that in spite of the clearly counter-intuitive nature of the approach, the problem associated with riboflavin in process liquids can be reduced or eliminated by the deliberate and selectively timed use of a selected type and amount of actinic radiation to treat any such process liquid prior to hopping.

In a preferred embodiment, therefore, it has been found that a reduction in the amount of riboflavin can be effected by subjecting a riboflavin-containing process liquid to the action of actinic radiation of a wavelength adapted to decompose riboflavin prior to hopping. The so-treated process liquid is then finished (including being hopped) to product in the usual manner by conventional brewing procedures.

The amount and type of radiation must be sufficient to produce significant decomposition of the riboflavin effectively, the "effective amount" as used herein being readily determinable by routine experimentation.

It has further been found, however, that there are significant advantages with respect to process efficacy when the wavelength output profile of the photon source is matched as nearly as possible to the wavelengths that affect the quantum state of the target molecular species; in this case, riboflavin.

In connection with the foregoing, it has been found to be highly desirable to employ low-powered indium-doped arc lamps as photon sources, such lamps being outstanding with respect to the preferred power output distributions that are suitable for the purposes contemplated herein.

The present invention has special application to the production of a beer having enhanced stability to light. This stability can, in situations where incident light causes deterioration of the product, lead to an extended shelf life—up to 25 percent or more than is typical for regular, untreated, beer under similar conditions.

In a preferred embodiment of the invention, there is provided an improved process for the production of a beer, in which process a process liquid having a high riboflavin content is hopped to produce the desired beverage, wherein the improvement comprises treating the process liquid with an effective amount of actinic radiation having a wavelength greater than 300 nanometers and adapted to decompose riboflavin, whereby the riboflavin content is reduced to less than 0.2 ppm and the resulting beer has enhanced stability to light.

It is believed that reducing the amount of riboflavin to a relatively low level prior to hopping inhibits the formation of "skunky" flavor-imparting sulfur compounds, and hence is responsible for the enhanced light stability. Moreover, it has also been found that if, as in a preferred embodiment of the present invention, the amount of riboflavin is reduced prior to the fermentation stage of the brewing process (for example, in the unhopped wort), the same beneficial result is achieved. This is very advantageous and very unexpected since, as indicated above, those skilled in the art have always thought that significant levels of riboflavin reduction prior to fermentation would be ineffectual from a practical standpoint.

It is preferred that at least 90 percent, more preferably 95 percent, and most preferably substantially all, of the riboflavin be removed from the process liquid prior to hopping, although reductions in excess of as little as 50 percent can be useful. In practice, this means the process liquid, after treatment and prior to hopping, may, if wort, have a maximum riboflavin content of less than about 0.2 ppm, preferably less than about 0.1 ppm, and more preferably less than about 0.05 ppm. It also means that the process liquid, after treatment and prior to hopping, may, if a fermented liquid, have a maximum riboflavin content of less than about 0.15 ppm, preferably less than about 0.1 ppm, more preferably less than about 0.07 ppm, and most preferably less than about 0.03 ppm.

The desired hopped malt beverage can be produced using generally well-known brewing procedures adapted, where necessary, to incorporate the required riboflavin reduction stage, preferably by the preferred light treatment of the present invention at an appropriate stage. Consequently, an all-malt or a malt-plus-adjunct combination can be used as a starting substrate, as desired.

As employed herein, the term "process liquid" means any unhopped wort or fermented wort (including green or bright beer) produced using malt, and "actinic light" means light of a predetermined wavelength that is capable of stimulating certain chemical reactions, and, in particular, the decomposition of riboflavin. Typically, the actinic light will have a wavelength greater than about 300 nanometers, but, generally, less than about 700 nanometers. It has been found advantageous to use light having a wavelength greater than about 340 nanometers, since radiation below those ranges may adversely affect other components of the processing liquids, causing their destruction and consequent adverse effects on the flavor of the product. The desired results are obtained most efficiently with radiation having a wavelength greater than about 340 nanometers, but less than about 550 nanometers.

It has been found that lamps having power output distributions of at least about 90 percent in the range of between about 300 nanometers and about 800 nanometers (as, for example, relatively low-power, indium-doped arc lamps) are particularly useful. Even more preferably, the lamp should have a power output of at least about 90 percent between about 300 and about 700 nanometers; especially at least about 60 percent between about 340 and about 550 nanometers; particularly at least about 50% between about 350 and about 500 nanometers; and most especially, greater than about 20 percent between about 410 and about 450 nanometers. All of the percentages set forth herein are based on wavelength-specific output power, as measured in watts per square meter at a distance from the light source of three meters.

The actual amount or "dose" of radiation is not critical, provided it is sufficient to effect the desired decomposition or reduction of the riboflavin content, resulting in the desired increase in light stability. Standard tests for the determination of riboflavin content are available and can readily be used to confirm that the desired reduction in riboflavin content has been achieved.

Process efficacy, on the other hand, is related to the proportion of the light energy that is available to effect the desired photochemical destruction of the target molecular species, as well as the extent to which collateral, but unintended, photochemical changes are avoided by the concentration of energy output into a relatively narrow bandwidth (although light filters could be used as an alternative means for managing this).

Beer that is untreated by the process of the present invention, packaged in clear flint glass, green glass, or the like, and subjected to strong light, e.g., sunlight or artificial light indoors, can develop an unacceptable skunky flavor within a matter of minutes; quite often, within 20 minutes. The skunky flavor is readily discernible by experienced taste panelists who routinely make quality control evaluations in beer products. Such panels have descried that beverages treated by the process of the present invention do not develop the same degree of skunky flavor for at least about 16 hours and, in fact, may not do so for as long as about 20 to 30 hours or more.

Generally, hops or hop pellets are used to ensure that the "traditional" beer taste is obtained. Although there is a small amount of riboflavin in hops and hop pellets, it is insignificant as taught herein. However, even that small riboflavin content could be removed if desired. Moreover, hop extracts can be substituted for the hops or hop pellets. Such extracts do not contain any riboflavin and, hence, can be used to advantage in the present invention.

Additionally, the yeast pitched to commence fermentation may include some small amount of riboflavin, but, again, this should not be sufficient to affect the present invention adversely. However, it would be advantageous to use a yeast that is substantially free of riboflavin or is, at least, riboflavin-deficient.

The decomposition of the riboflavin proceeds faster at elevated temperatures. Consequently, it is preferred to treat the wort as soon as it exits the mash tun, at which point its temperature is normally as high as about 90° C. This has the additional benefit of ensuring the clarity of the wort with no trub formation, factors that assist treatment with light.

It has also been found that the desired decomposition of the riboflavin is substantially unaffected by the presence of oxygen in the process liquid, and hence either aerobic or anaerobic processing conditions can be employed.

The dose rate is not critical, although higher rates minimize the time required to effect the light treatment stage and are, thus, preferred, especially when the process liquid is being treated in a continuous process.

Where the improved process of the present invention is a continuous one, it is preferred that it be of the kind described in U.S. Pat. No. 5,696,380, the disclosure of which is incorporated herein by reference in its entirety. The invention disclosed in that patent is a flow-through photochemical reactor comprising a fluid conducting channel. More particularly, the reactor includes a photon-transparent wall for admitting photons into the channel. The reactor further includes internally housed, static fluid-dynamic-effector means for passively inducing substantial transverse (i.e., radial) mixing flow within a fluid during its longitudinal transit through the channel. This substantially increases the uniformity of the fluid's exposure to photons radiating through the wall and into the channel.

The foregoing embraces, within its broad scope, a photon transparent tubular reactor (with mechanically static, fluid-dynamic effector elements disposed internally thereof) having light sources arranged externally of the channel, as, for example, in a radial array around the tube's exterior. To make the most efficient use of the photons emitted from a light source, however, it is preferred that the light source be located within the channel so that the photons can radiate outwardly therefrom, thus being directly available for reaction in the surrounding fluid flow.

Accordingly, the preferred flow-through photochemical reactor will include a reactor body, circumscribing a longitudinally extending channel having a generally annular cross-section. The channel accommodates the passage of fluids between an inner wall of the reactor body, and an outer wall of a photon transmitting tube. The tube is housed internally of the reactor, and is preferably arranged in co-axial alignment (i.e., a longitudinally centered, concentric relation) relative to the inner wall of the reactor.

This preferred reactor includes an arrangement of mechanically static, fluid dynamic elements. These "operate" by passively inducing or effecting a substantial turbulent flow within the fluid as it passes through the annular channel and this action substantially increases the uniformity of the fluid's exposure to photons radiating from a source within that tube into the fluid as it is conducted through the channel. Note, too, that these mechanically static elements can include those that can be manufactured from transparent materials.

Static effector elements suitable for use in the process of the present invention are known in the mixing arts where they are known as "static mixers." Exemplary forms of such mixers are disclosed in a variety of U.S. patents, as well as elsewhere, and although not all are equally well suited for use in the practice of the present invention, they each disrupt the streamline flow and, to that extent, are potentially relevant to the present combination. The benefit of the preferred "static effector" is directly tied to the efficiency with which it circulates flow toward and away from the surface(s) through which the photons are transmitted. The most efficacious flow pattern is one in which photon-exposed fluid is displaced or replaced by fluid that is either unexposed or less exposed than the fluid that it displaces or replaces in proximity to the photon-transmitting surface(s). Given the economic, and, hence, industrial, advantages that attend in-line, longitudinal flow processes, the efficacy of a given static effector is directly related to the degree to which a particular effector directs and redirects transverse (i.e., relative to the overall longitudinal flow of the fluid) flow toward the photon-transmitting surface(s) of the reactor.

Turning now to an alternative apparatus as shown in FIG. 1, a 35-liter reactor, generally designated 10, comprises a circular housing 12 having an interior reflective surface 14. Extending down along the central axis of the housing is a one-kilowatt indium doped arc lamp 15 (available from Philips), the lamp being secured in position in its housing 15 which itself is secured to the vessel lid 18. The housing 16 also includes circulation means for circulating a heating/cooling fluid, which enters via port 20 and exits via port 22. The lamp has a power output distribution of:

about 93 percent between 300 and less than about 780 nanometers;

about 90 percent between 300 and 700 nanometers;

about 63 percent between 340 and 550 nanometers;

about 57 percent between 350 and 500 nanometers; and about 20 percent between 410 and 450 nanometers.

All of the above percentages are based on wavelength specific output power as measured in watts per square meter at a distance from the light source of three meters.

The reactor is also provided with a tube 24 through which a gas, such as, nitrogen, can be introduced into the reactor adjacent the interior base and a port 26 to allow the gas to vent following its carrying out a sparging action in the body of the liquid in the reactor. Mechanical stirring means (not shown) can be placed in the reactor to provide additional stirring if necessary or the sole stirring action if desired.

Figure 2A:
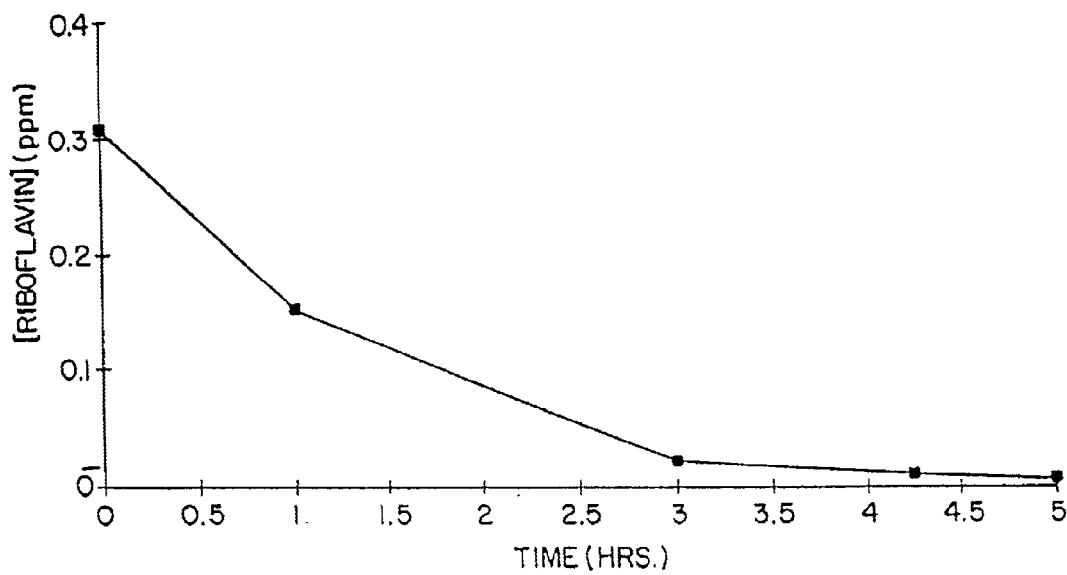
FIGS. 2a and 2b are graphs showing the elimination of riboflavin from an unhopped wort under the influence of actinic radiation.

Unhopped (sweet) wort from commercial lager production was kept at an elevated temperature (70° C.) until it was transferred to the batch scale reactor 10 shown in FIG. 1. Silicon anti-foam was added (0.3 milliliter) and the wort purged with nitrogen, which also generated turbulent mixing. After 25 minutes of sparging to reduce oxygen content, the agitated wort was irradiated. The effect of the irradiation was monitored by evaluation of riboflavin concentration by an HPLC method similar to that described by W. Moll in *Frontiers of Flavour*, Proceedings of the 5th International Flavour Conference, Porto Kerras, Chalkidiki, Greece, Jul. 1–3, 1987. FIG. 2a shows the loss of riboflavin in the wort. The loss of riboflavin ($R_b$) appears to follow approximately first order kinetics—that is:

$$\frac{-d[R_b]}{dt} = k[R_b]$$

where k is the pseudo first order rate constant and varies with temperature, lamp power output, oxygen content, and reactor design.

Note that riboflavin does not appear to be photo-catalytic, since it is consumed in the photo-production of the off-flavor sulfur-containing compounds, which are believed to be thiols. Thus, low residual levels of riboflavin can, at least to some degree, be tolerated without unduly compromising the flavor of the beer. Such low levels of riboflavin, which can be readily determined experimentally using the taste panel route, are referred to herein as being "insignificant amounts."

Figure 2B:
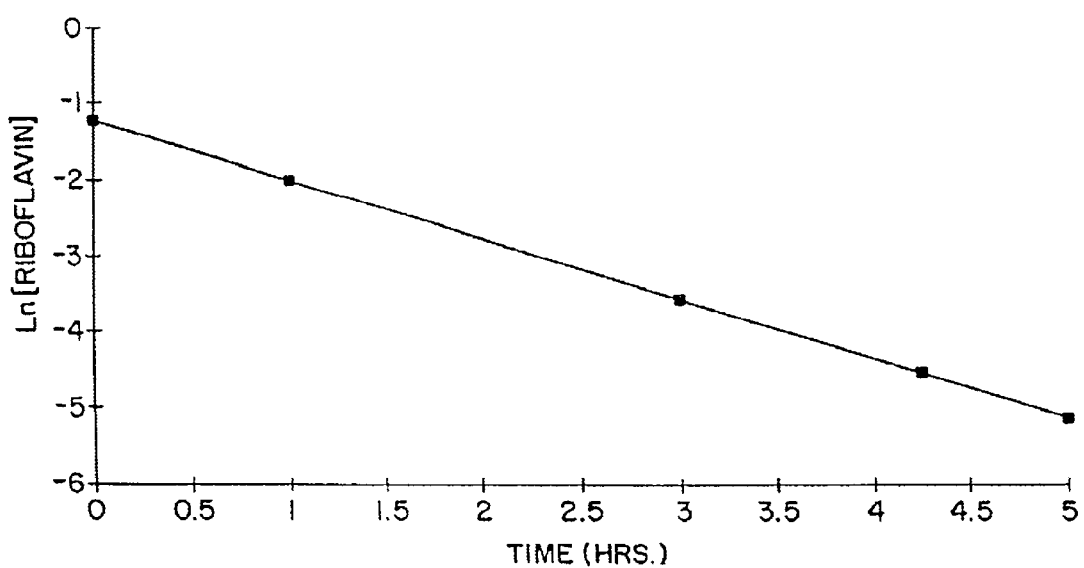

In this example the rate constant is given as the negative slope of the graph shown in FIG. 2b which is $-0.0129$ min$^{-1}$. Thus, in 300 minutes the riboflavin concentration as depicted in the graph, had been depleted from 0.31 ppm to 0.007 ppm or by approximately 98 percent. If desired, the theoretical energy requirements can readily be calculated, and this may provide some guidance in selecting optimal equipment and light processing conditions.

Figure 3:
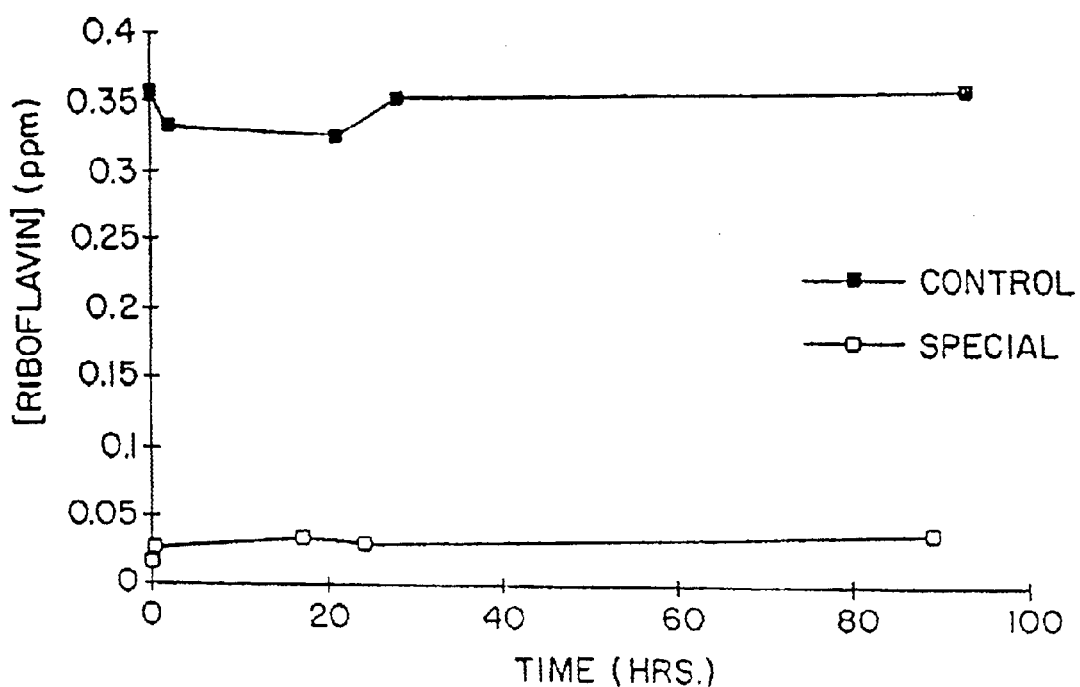
FIG. 3 is a graph showing the concentration of riboflavin during the fermentation of light-treated wort and untreated wort as the control.

Wort treated in accordance with the process of the present invention and a 35 liter batch of standard untreated wort (as a control) were each brewed to produce a beer according to standard pilot plant procedure. Riboflavin concentrations were measured at strikeout (0.019 ppm) and after pitching (0.027 ppm) with a standard lager yeast grown in synthetic media and washed twice with distilled water. As can be seen, riboflavin concentration increased slightly, presumably because of riboflavin present in the pitched yeast and in the hops, and the fermentations were monitored. The results are given in FIG. 3. At dropping, the riboflavin concentration was 0.070 ppm for the treated wort and 0.395 ppm for the control. The finished beer produced using wort treated according to the process of the present invention possessed a riboflavin concentration of 0.032 ppm (13 percent relative to control) and of 0.25 ppm for beer produced from untreated wort.

The treated and control beers were bottled in flint glass, and oxygen was carefully excluded on sealing. The beers at 4° C. were then evaluated for light stability by irradiating the bottles with visible (actinic) light from a 100-watt tungsten filament light bulb located at a distance of 20 centimeters. The beers were irradiated for the various times given in the table below and then evaluated by experienced taste panelists. The results represent the average evaluations recorded by the panelists. The terms used describe the degree of skunky flavor observed, "strong" indicating unacceptable and "trace" meaning still acceptable.

| Time Irradiated (hours) | Control Beer | Treated Beer |
|---|---|---|
| 2 | strong | none |
| 4 | strong | trace |
| 8 | strong | trace |
| 16 | strong | trace |

As can be seen from the table, the beer produced without the light treatment of the present invention exhibited a strong, i.e., unacceptable, skunky flavor within less than two hours of irradiation, whereas the beer made utilizing the light treatment of the present invention exhibited only a trace of skunky flavor and was still acceptable even after it had been irradiated for 16 hours. In repeat experiments, irradiation for periods in excess of 20 hours produced the same effect. These results clearly indicate that the beer produced according to the process of the present invention has enhanced light stability.

Figure 4:
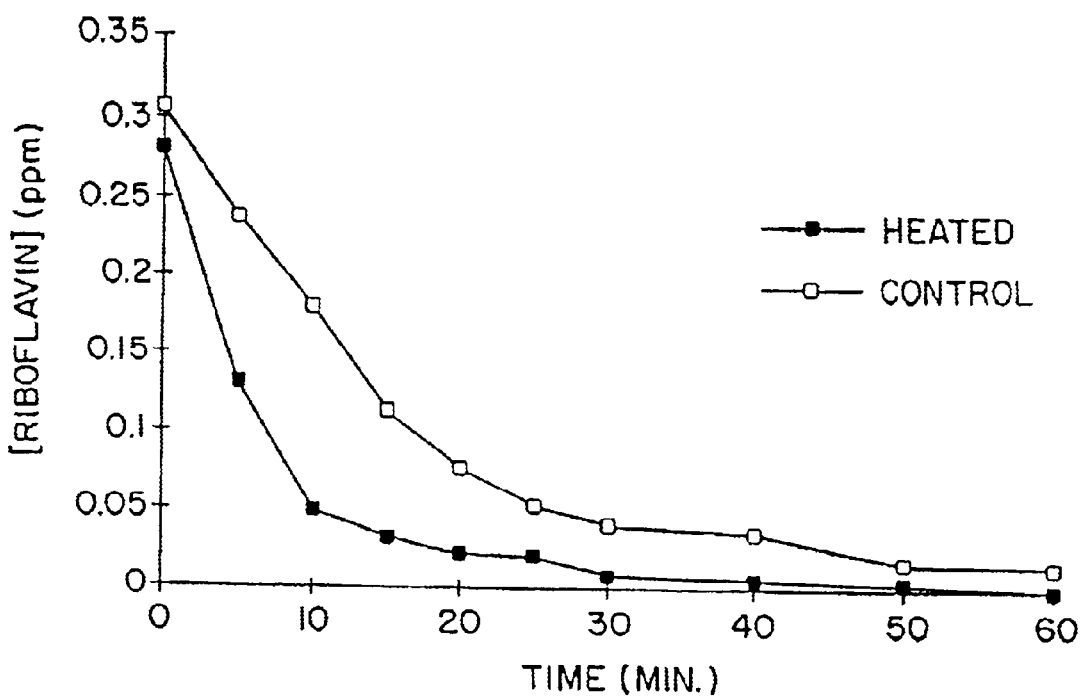
FIG. 4 is a graph showing the rate of destruction of riboflavin in wort by light treatment at two different temperatures.

The photochemical decomposition of riboflavin proceeds faster at higher temperatures, as is demonstrated by the photolysis of wort containing riboflavin at different temperatures (refer to FIG. 4). In this test, one liter of normal production unhopped sweet wort was heated to 70° C., then irradiated. A second liter of the same wort was irradiated at a control temperature of 20° C. As is clearly demonstrated in FIG. 4, the rate of destruction of riboflavin is greatly increased at the higher temperature.

Figure 5:
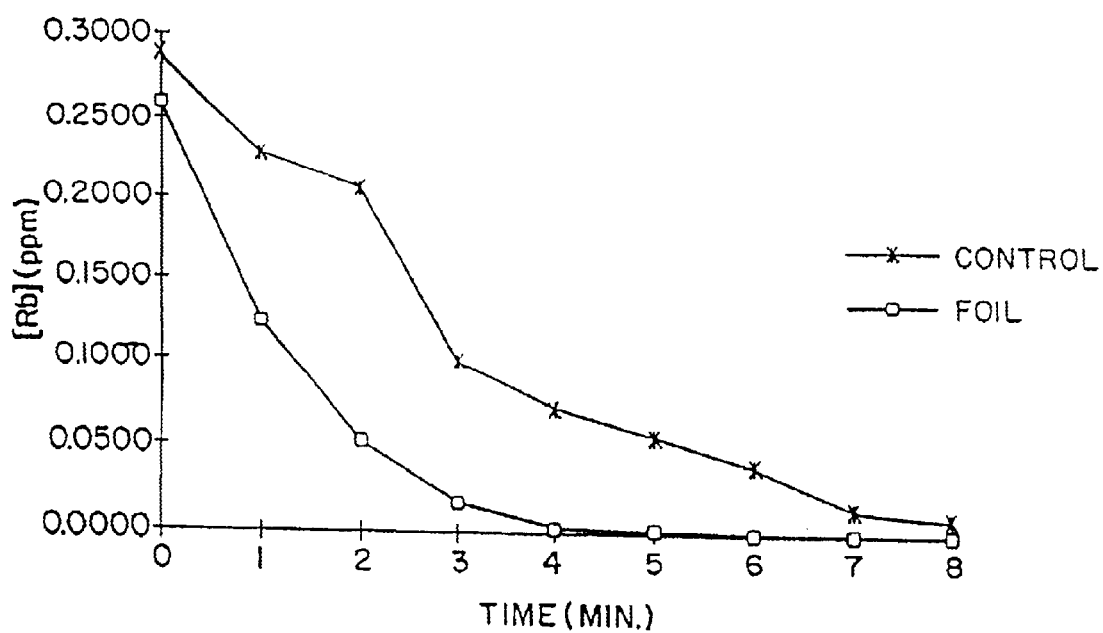
FIG. 5 is a graph showing the effect of increasing the dosage rate of the light treatment on the destruction of riboflavin in model solutions by using a reflective foil.

The reactor design can be made more efficient by including a reflective inner surface 28 (refer to FIG. 1) which reflects light which is not immediately or directly absorbed and thereby increases the effective dosage rate. This effect is demonstrated by reference to FIG. 5. Here, two 300-milliliter solutions of riboflavin in a pH 4 buffer were irradiated. One solution had a reflective foil in place around the container and the other one did not. As can be seen, the rate of elimination of riboflavin is effectively increased by a factor of three by use of the reflector system.

The invention has been described in detail with particular reference to preferred embodiments thereof, but it is understood that variations and modifications can be effected within the spirit and scope of the invention.

What is claimed is:

1. In a process for the production of a hopped malt beverage wherein a process liquid having a high riboflavin content is hopped to produce the desired beverage, the improvement comprising treating the process liquid with an effective amount of actinic radiation from an indium-doped arc lamp having a power output of greater than about 20 percent between about 410 and about 450 nanometers whereby the riboflavin content is reduced to less than about 0.2 ppm and the resulting hopped malt beverage has enhanced stability to light.

2. The process of claim 1 wherein the hopped malt beverage is beer.

3. The process of claim 1, wherein the lamp has a power output of at least about 90 percent between about 300 and about 700 nanometers.

4. The process of claim 3, wherein the lamp has a power output of at least about 60 percent between about 340 and about 550 nanometers.

5. The process of claim 4, wherein the lamp has a power output of at least about 50 percent between about 350 and about 500 nanometers.

6. The process of claim 2 in which the process liquid is wort.

7. The process of claim 6 wherein the riboflavin content is reduced to less than about 1.0 ppm.

8. The process of claim 7 wherein the riboflavin content is reduced to less than about 0.07 ppm.

9. The process of claim 8 wherein the riboflavin content is reduced to less than about 0.03 ppm.

10. The process of claim 2 wherein the actinic radiation has a wavelength of from 300 to 700 nanometers.

11. The process of claim 10 wherein the actinic radiation has a wavelength of from 340 to 550 nanometers.

12. The process of claim 11 wherein the actinic radiation has a wavelength of from 410 to 450 nanometers.

13. The process of claim 2 wherein the process liquid is maintained at a temperature of from about 25° C. to about 90° C. during the treatment with actinic radiation.

14. The process of claim 1, wherein the process is a continuous process and the irradiation is carried out in a static mixer.

* * * * *